United States Patent
Chen et al.

(10) Patent No.: US 8,882,300 B2
(45) Date of Patent: Nov. 11, 2014

(54) COLOR FILTER AND EDGE-TYPE BACKLIGHT MODULE USING THE SAME

(71) Applicant: National Tsing Hua University, Hsinchu (TW)

(72) Inventors: Cheng-Huan Chen, Hsinchu (TW); Po-Hung Yao, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 164 days.

(21) Appl. No.: 13/745,277

(22) Filed: Jan. 18, 2013

(65) Prior Publication Data
US 2013/0188390 A1    Jul. 25, 2013

(30) Foreign Application Priority Data
Jan. 20, 2012  (TW) .............................. 101102477 A

(51) Int. Cl.
| | |
|---|---|
| *F21V 9/00* | (2006.01) |
| *G02B 27/10* | (2006.01) |
| *F21V 8/00* | (2006.01) |
| *G02B 5/20* | (2006.01) |
| *G02B 27/14* | (2006.01) |

(52) U.S. Cl.
CPC .............. *G02B 27/102* (2013.01); *G02B 6/005* (2013.01); *G02B 5/203* (2013.01); *G02B 27/141* (2013.01); *G02B 5/201* (2013.01)
USPC ............ 362/293; 362/607; 362/618; 349/115

(58) Field of Classification Search
CPC ...... G02B 5/201; G02B 6/005; G02B 27/102; F21V 5/00; F21V 5/002; F21V 9/10; F21V 14/006; F21V 14/08
USPC ........... 362/31, 293, 330, 339, 606–613, 615, 362/618–620, 623, 626, 627; 359/568, 615, 359/634; 349/56–58, 61, 62, 65, 104–108, 349/115; 430/7
See application file for complete search history.

(56) References Cited

U.S. PATENT DOCUMENTS

| | | | | |
|---|---|---|---|---|
| 5,267,060 | A * | 11/1993 | Colton ............................ | 359/15 |
| 5,822,029 | A * | 10/1998 | Davis et al. ................... | 349/115 |
| 6,368,757 | B1 * | 4/2002 | Choi ................................ | 430/7 |
| 6,573,961 | B2 * | 6/2003 | Jiang et al. .................... | 349/115 |
| 6,774,963 | B1 * | 8/2004 | Nakao et al. .................. | 349/104 |
| 6,794,216 | B2 * | 9/2004 | Ko .................................. | 438/72 |
| 6,831,720 | B2 * | 12/2004 | Jiang et al. .................... | 349/115 |
| 6,882,386 | B2 * | 4/2005 | Moon et al. .................... | 349/98 |
| 6,900,864 | B2 * | 5/2005 | Iino ................................ | 349/115 |
| 7,098,974 | B2 * | 8/2006 | Ko .................................. | 349/108 |

FOREIGN PATENT DOCUMENTS

JP         2003098519 A  *  4/2003

* cited by examiner

*Primary Examiner* — Hargobind S Sawhney
(74) *Attorney, Agent, or Firm* — Muncy, Geissler, Olds & Lowe, P.C.

(57) ABSTRACT

A color filter comprises a first filter element and a second filter element. The first filter element includes a plurality of arrayed filter regions allowing a first spectral component of incident light to pass and reflecting other spectral components of the incident light. The second filter element includes a plurality of arrayed filter regions allowing a second spectral component of the incident light to pass and reflecting other spectral components of the incident light. The center of the filter regions of the second filter element is deviated from the center of the filter regions of the first filter element so that the light reflected from the first filter element can pass through the second filter element. Thereby is enhanced the energy efficiency of the color filter. An edge-type backlight module using the abovementioned color filter is also disclosed.

20 Claims, 4 Drawing Sheets

COLOR FILTER AND EDGE-TYPE BACKLIGHT MODULE USING THE SAME

BACKGROUND OF THE INVENTION

1. Field of the Invention

The present invention relates to a color filter and an edge-type backlight module using the same, particularly to a reflective color filter and an edge-type backlight module using the same.

2. Description of the Prior Art

LCD (Liquid Crystal Display) has been the mainstream flat panel display technology. The conventional color filter is normally fabricated via using absorptive color dyes to form arrayed RGB pixels. The conventional color filter absorbs most light energy and has a very low light transmittance. Therefore, the conventional color filter is one of the LCD elements causing maximum loss of light. Accordingly, how to promote energy efficiency of color filters has been a problem the manufacturers are eager to overcome.

SUMMARY OF THE INVENTION

The present invention is directed to a color filter and an edge-type backlight module using the same. The color filter of the present invention comprises a plurality of filter elements. Each filter element includes a plurality of filter regions arranged in array, allowing only a specific spectral component to pass and reflecting the other spectral components. The reflected spectral components are further reflected by an appropriate optical design to corresponding filter regions and then pass the color filter to form a color array. The present invention promotes the energy efficiency of color filters via recycling the light of the other spectral components.

In one embodiment, the proposed color filter comprises a first filter element and a second filter element. The first filter element includes a plurality of arrayed filter regions and a light-permeable region. The filter regions of the first filter element allow a first spectral component of the incident light to pass and reflect the other spectral components of the incident light. The second filter element is arranged on the first filter element and comprises a plurality of arrayed filter regions and a light-permeable region. The filter regions of the second filter element allow a second spectral component of the incident light to pass and reflect the other spectral components of the incident light. The center of the filter regions of the second filter element is deviated from the center of the filter regions of the first filter element. The light-permeable regions of the first filter element and the second filter element allow the incident light to pass.

In one embodiment, the proposed edge-type backlight module comprises a light guide plate, a light emitting module and a color filter. The light guide plate includes a light-emitting face, a bottom face opposite to the light-emitting face and at least one light-entrance face connecting with the light-emitting face and the bottom face. The light emitting module is arranged beside the light-entrance face and provides a light source. The color filter is arranged on the light-emitting face and converts the light source into a color array. The color filter comprises a first filter element and a second filter element. The first filter element includes a plurality of arrayed filter regions and a light-permeable region. The filter regions of the first filter element allow a first spectral component of the incident light to pass and reflect the other spectral components of the incident light. The second filter element is arranged on the first filter element and comprises a plurality of arrayed filter regions and a light-permeable region. The filter regions of the second filter element allow a second spectral component of the incident light to pass and reflect the other spectral components of the incident light. The center of the filter regions of the second filter element is deviated from the center of the filter regions of the first filter element. The light-permeable regions of the first filter element and the second filter element allow the incident light to pass.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
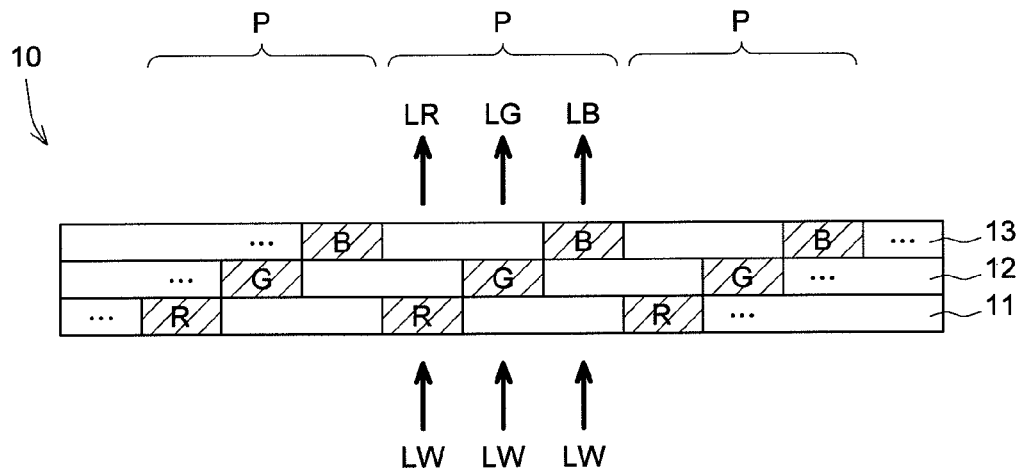
FIG. 1 is a diagram schematically illustrating a color filter according to one embodiment of the present invention.
Figure 2:
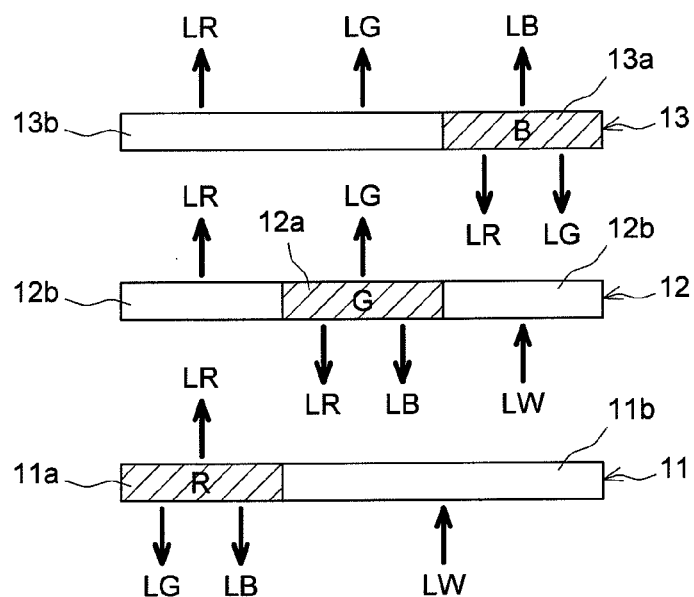
FIG. 2 is an exploded view schematically illustrating a color filter according to one embodiment of the present invention.

Refer to FIG. 1 and FIG. 2 for a color filter according to one embodiment of the present, invention. The color filter 10 of the present invention comprises a first filter element 11 and a second filter element 12 arranged on the first filer element 11. In one embodiment, the color filter 10 further comprises a third filter element 13 arranged on the second filter element 12. Each of the first filter element 11, second filter element 12 and third filter element 13 includes a plurality of arrayed filter regions 11a, 12a or 13a and a light-permeable region 11b, 12b or 13b. The light-permeable regions 11b, 12b and 13b allow the full spectrum of the incident light (such as white light LW) to pass. The three layers of filter elements shown in FIG. 1 and FIG. 2 are only to exemplify the color filter. The present invention does not constrain that the color filter can only have three layers of filter elements. The persons skilled in the art should be able to realize the present invention, using two layers or more than three layers of filter elements.

The filter regions 11a of the first filter element 11 allow a first spectral component (such as red light LR) of the incident light and reflect the other spectral components of the incident light. The filter regions 12a of the second filter element 12 allow a second spectral component (such as green light LG) of the incident light and reflect the other spectral components of the incident light. The filter regions 13a of the third filter element 13 allow a third spectral component (such as blue light LB) of the incident light and reflect the other spectral components of the incident light.

The filter regions 11a, 12a and 13a of the first filter element 11, second filter element 12 and third filter element 13 do not overlap. In other words, the center of the filter regions 12a of the second filter element 12 is deviated from the center of the filter regions 11a of the first filter element 11, and the center of the filter regions 13a of the third filter element 13 is deviated from the center of the filter regions 11a of the first filter element 11 and the center of the filter regions 12a of the second filter element 12. Thereby, the filter regions 11a, 12a and 13a of the first filter element 11, second filter element 12 and third filter element 13 are all illuminated by the incident light and respectively allow the corresponding spectral components to pass. Thus, red light LR, green light LG and blue light LB respectively pass the arrayed filter regions 11a, 12a and 13a to form an RGB color array. For LCD, a set of filter regions of red light, green light and blue light corresponds to a pixel.

The filter regions 11a, 12a and 13a of the first filter element 11, second filter element 12 and third filter element 13 do not absorb the spectral components outside the specified spectral components but reflect them. The light reflected by one filter region can be processed by an appropriate optical design, such as reflective elements, to pass other filter regions. Referring to FIG. 2, for example, the filter region 11a of the first filter element 11 allows red light LR to pass and reflects green light LG and blue light LB. The reflected green light LG and blue light LB are further reflected back to the color filter 10 and respectively pass the filter region 12a of the second filter element 12 and the filter region 13a of the third filter element 13. Therefore, the color filter of the present invention is more energy-efficient than the conventional absorptive color filter.

Figure 3:
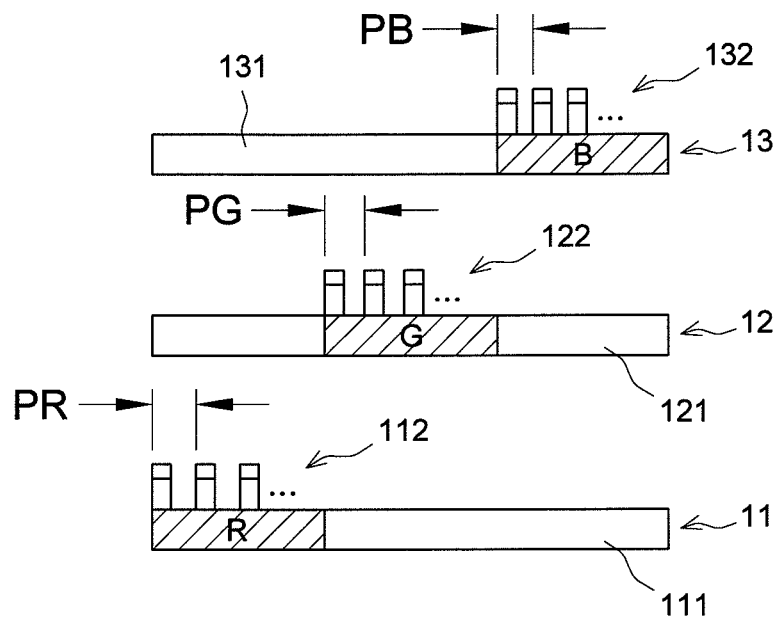
FIG. 3 is a diagram schematically illustrating the optical grating structure of a color filter according to one embodiment of the present invention.

Referring to FIG. 3, the first filter element 11, second filter element 12 and third filter element 13 independently include a substrate 111, 121 and 131 and a plurality of filter structures corresponding to the filter regions. For example, the filter structure is an optical grating structure 112, 122 and 132. The optical characteristic of the filter region can be modified by controlling the period (PR, PG or PB), height and width of the optical grating structure. In one embodiment, the optical grating structures 112, 122 and 132 may be single-layer metallic gratings, more than two layer metallic composite gratings, or metal-dielectric gratings, as shown in FIG. 3. It should be noted that the optical grating structure can also polarize the light. In other words, the optical grating structure allows the light having a specified polarization direction to pass and reflects the light having other polarization directions. Similar to recycling the light of the spectral components outside the specified spectral component, the light of the polarization directions other than the specified polarization direction is reflected by a diffusion structure to generate light of specified polarization directions able to pass the filter elements. In one embodiment, via an appropriate design, the color filter of the present invention can take the place of the absorptive polarizer in LCD.

Figure 4:
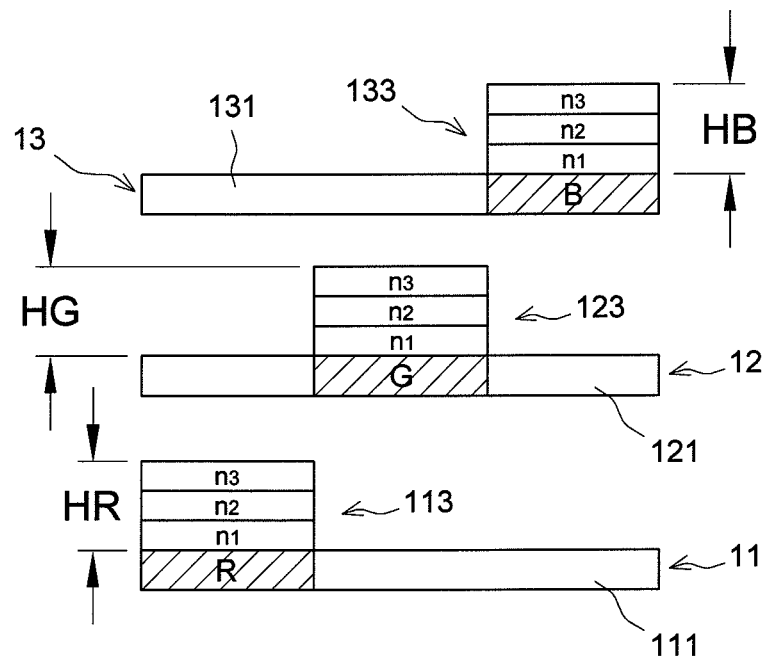
FIG. 4 is a diagram schematically illustrating the coating film structure of a color filter according to one embodiment of the present invention.

Referring to FIG. 4, in one embodiment, the filter structure comprises a plurality of coating films 113, 123 and 133. For example, the characteristics of the filter region can be modified via forming one or more layers of coating films respectively having refractivities n1, n2 and n3 and controlling the thicknesses of the coatings HR, HG and HB.

Figure 5:
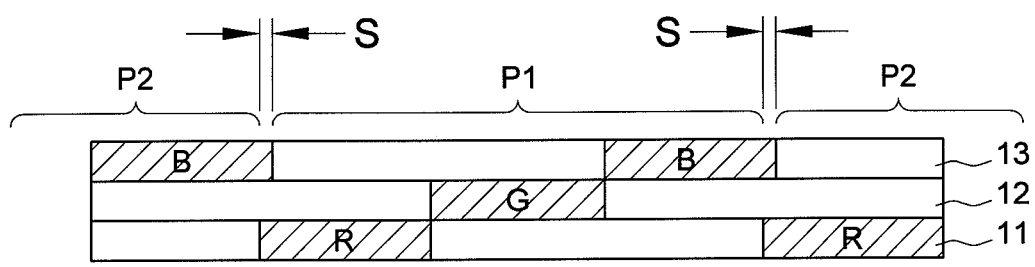
FIG. 5 is a diagram schematically illustrating a color filter according to another embodiment of the present invention.

In one embodiment, any two of the first filter element 11, second filter element 12 and third filter element 13 are partially overlapped in the light-emitting direction. Referring to FIG. 5, for example, the filter region corresponding to the boundary of pixel P1 and the filter region corresponding to the boundary of pixel P2 overlap in the light-emitting direction to form an overlapped region S. The red light having passed the filter region of the first filter element 11 is unable to pass the filter region of the third filter element 13. Therefore, the overlapped region forms a dark area and thus can define a pixel without using shading elements (such as black matrix). Besides, appropriately designed overlapped regions provide a greater tolerance in overlapping the first filter element 11, second filter element 12 and third filter element 13 and thus make the color filter easy to fabricate.

Figure 6:
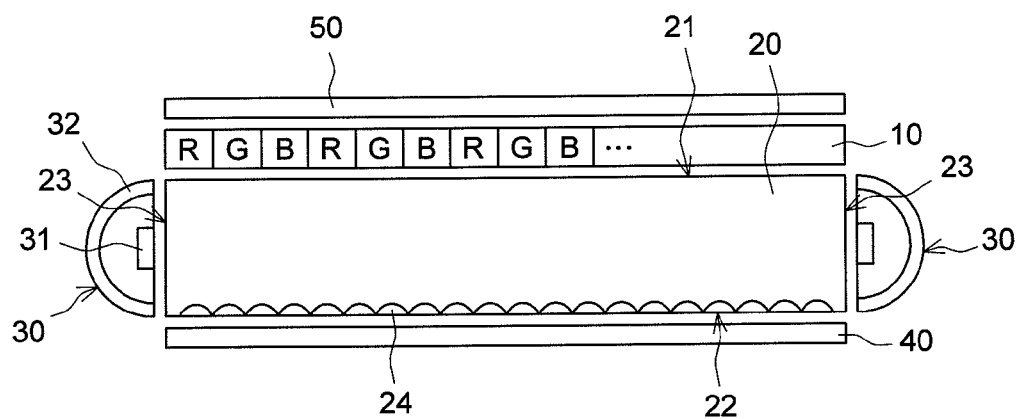
FIG. 6 is a diagram schematically illustrating an edge-type backlight module according to one embodiment of the present invention.

Refer to FIG. 6 for an edge-type backlight module according to one embodiment of the present invention. The edge-type backlight module of the present invention comprises a light guide plate 20, a light emitting module 30 and a color filter 10. The light guide plate 20 includes a light-emitting face 21, a bottom face 22 opposite to the light-emitting face 21 and at least one light-entrance face 23 connecting with the light-emitting face 21 and the bottom face 22. The light emitting module 30 is arranged beside the light-entrance face 23 and includes at least one light emitting element 31 providing a light source. For example, the light emitting element 31 may be LED (Light Emitting Diode) or CCFL (Cold Cathode Fluorescent Lamp). In one embodiment, the light emitting module 30 may include a reflective element 32 arranged opposite to the light-entrance face 23 of the light guide plate 20. The reflective element 32 reflects the light generated by the light emitting element 31 back to the light-entrance face 23 of the light guide plate 20, promoting the utilization rate of light. It should be noted that the light emitting modules 30 may be installed in a single side or multiple sides of the light guide plate 20. The color filter 10 is arranged on the light-emitting face 21 side of the light guide plate 20 and converts the light generated by the light emitting module 30 into a color array. The details of the color filter 10 have been described hereinbefore and will not repeat herein.

In one embodiment, the edge-type backlight module of the present invention further comprises a first reflective element 40 arranged on the bottom face 22 of the light guide plate 20. The first reflective element 40 reflects the light coming from the light emitting element 31 to the light-emitting face 21 of the light guide plate 20. The first reflective element 40 also reflects the light reflected by the color filter 10 to pass through the light-emitting face 21 of the light guide plate 20 and return to the color filter 10. Thereby is recycled the light energy. For example, the first reflective element 40 may be a portion of the baseplate accommodating the backlight module or a reflective layer arranged on the bottom face 22 of the light guide plate 20.

In one embodiment, the color filter 10 is integrated with the light guide plate 20. In such a case, the light reflected by the color filter 10 is directly projected into the light guide plate 20, and next reflected by the light guide plate 20 or the first reflective element 40, and then allowed to pass the corresponding filter regions of the color filter 10. Thus is reduced the energy absorbed by other elements.

In one embodiment, the light guide plate 20 further includes a diffusion structure 24 arranged on the bottom face 22. For example, the diffusion structure 24 may be a roughened structure or a microstructure formed on the bottom face 22, or a diffusion film installed on the bottom face 22. The diffusion structure 24 not only distributes light uniformly but also converts the light having a single polarization direction into a light having multiple polarization directions.

In one embodiment, the edge-type backlight module of the present invention further comprises a diffusion element 50 arranged on the light-emitting face 21 side of the light guide plate 20, as shown in FIG. 6. The diffusion element 50 makes the light emitted from the light guide plate 20 distributed more uniformly.

In conclusion, the color filter and the edge-type backlight module of the present invention adopt a reflective filter technology. The color filter of the present invention comprises a plurality of filter elements. Each filter element includes a plurality of arrayed filter regions allowing only a specified spectral component of the incident light to pass and reflecting the other spectral components of the incident light. The light reflected by one set of filter regions is further reflected by an appropriate optical design to other sets of filter regions and allowed to pass the color filter by the corresponding sets of filter regions, whereby is formed a color array. The color filter of the present invention promotes the energy efficiency via recycling the other spectral components of light. In the present invention, the filter regions can be fabricated separately and then integrated into a color filter. Therefore, the color filter of the present invention is simple-structured and easy to fabricate.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A color filter comprising:
    a first filter element comprising a plurality of arrayed filter regions and a light-permeable region, wherein said filter regions of said first filter element allow a first spectral component of incident light to pass and reflect other spectral components of said incident light, and said light-permeable region allows said incident light to pass; and
    a second filter element arranged on said first filter element and comprising a plurality of arrayed filter regions and a light-permeable region, wherein said filter regions of said second filter element allow a second spectral component of said incident light to pass and reflect other spectral components of said incident light, said light-permeable region allows said incident light to pass, and a center of said filter regions of said second filter element is deviated from a center of said filter regions of said first filter element.

2. The color filter according to claim 1 further comprising:
    a third filter element arranged on said second filter element and comprising a plurality of arrayed filter regions and a' light-permeable region, wherein said filter regions of said third filter element allow a third spectral component of said incident light to pass and reflect other spectral components of said incident light, said light-permeable region allows said incident light to pass, and a center of said filter regions of said third filter element is deviated from said center of filter regions of said first filter element and said center of said filter regions of said second filter element.

3. The color filter according to claim 2, wherein said first filter element, said second filter element or said third filter element comprises a substrate and a plurality of filter structures arranged on said filter regions.

4. The color filter according to claim 3, wherein said filter structure comprises an optical grating structure or a plurality of coating films.

5. The color filter according to claim 4, wherein said optical grating structure is a metallic grating, a metallic composite grating, or a metal-dielectric grating.

6. The color filter according to claim 2, wherein said filter regions of any two of said first filter element, said second filter element and said third filter element are partially overlapped in a light-emitting direction.

7. The color filter according to claim 2, wherein said first spectral component, said second spectral component and said third spectral component are different, and each of said first spectral component, said second spectral component and said third spectral component is in a spectral range selected from red light, green light and blue light.

8. An edge-type backlight module comprising:
    a light guide plate comprising a light-emitting face, a bottom face opposite to said light-emitting face and at least one light-entrance face connecting with said light-emitting face and said bottom face;
    a light emitting module arranged beside said light-entrance face of said light guide plate and providing a light source; and
    a color filter arranged on said light-emitting face side of said light guide plate, converting said light source into a color array, and comprising:
        a first filter element comprising a plurality of arrayed filter regions and a light-permeable region, wherein said filter regions of said first filter element allow a first spectral component of incident light to pass and reflect other spectral components of said incident light, and said light-permeable region allows said incident light to pass; and
        a second filter element arranged on said first filter element and comprising a plurality of arrayed filter regions and a light-permeable region, wherein said filter regions of said second filter element allow a second spectral component of said incident light to pass and reflect other spectral components of said incident light, said light-permeable region allows said incident light to pass, and a center of said filter regions of said second filter element is deviated from a center of said filter regions of said first filter element.

9. The edge-type backlight module according to claim 8 further comprising:
    a first reflective element arranged on said bottom face side of said light guide plate and reflecting said light source and light reflected by said color filter to said light-emitting face.

10. The edge-type backlight module according to claim 8, wherein said light emitting module comprises a second reflective element arranged opposite to said light-entrance face of said light guide plate and reflecting said light source to said light-entrance face.

11. The edge-type backlight module according to claim 8, wherein said color filter further comprises a third filter element arranged on said second filter element and comprising a plurality of arrayed filter regions and a light-permeable region, wherein said filter regions of said third filter element allow a third spectral component of said incident light to pass and reflect other spectral components of said incident light, said light-permeable region allows said incident light to pass, and a center of said filter regions of said third filter element is deviated from said center of filter regions of said first filter element and said center of said filter regions of said second filter element.

12. The edge-type backlight module according to claim 11, wherein said first filter element, said second filter element or said third filter element comprises a substrate and a plurality of filter structures arranged on said filter regions.

13. The edge-type backlight module according to claim 12, wherein said filter structure comprises an optical grating structure or a plurality of coating films.

14. The edge-type backlight module according to claim 13, wherein said optical grating structure is a metallic grating, a composite-metal grating, or a metal-dielectric grating.

15. The edge-type backlight module according to claim 11, wherein said filter regions of any two of said first filter element, said second filter element and said third filter element are partially overlapped in a light-emitting direction.

16. The edge-type backlight module according to claim 11, wherein said first spectral component, said second spectral component and said third spectral component are different, and said first spectral component, said second spectral component and said third spectral component is in a spectral range selected from red light, green light and blue light.

17. The edge-type backlight module according to claim 8, wherein said color filter is integrated with said light guide plate.

18. The edge-type backlight module according to claim 8, wherein said light guide plate comprises a diffusion structure arranged on said bottom face of said light guide plate.

19. The edge-type backlight module according to claim 8 further comprising:
    a diffusion element arranged on said light-emitting face side of said light guide plate.

20. The edge-type backlight module according to claim 8, wherein said light emitting module includes at least one light emitting diode (LED) or cold cathode fluorescent lamp (CCFL).

* * * * *